United States Patent [19]
Nicotra

[11] 3,912,098
[45] Oct. 14, 1975

[54] MOTORCYCLE AND CONTAINER CARRIER FOR VEHICLES

[76] Inventor: William A. Nicotra, 1358 Goettman St., Pittsburgh, Pa. 15212

[22] Filed: Jan. 27, 1975

[21] Appl. No.: 544,106

[52] U.S. Cl..... 214/450; 224/42.03 A; 224/42.03 B; 224/42.04; 280/402
[51] Int. Cl.² ........................................... B60R 9/10
[58] Field of Search..................... 280/402; 214/450; 224/42.03 R, 42.03 A, 42.03 B, 42.07, 42.08, 42.43, 42.44, 29 R

[56] References Cited
UNITED STATES PATENTS

| | | | |
|---|---|---|---|
| 3,348,713 | 10/1967 | Will | 214/450 |
| 3,591,029 | 7/1971 | Coffey | 214/450 |
| 3,796,333 | 3/1974 | Goldstein | 224/42.03 B |
| 3,853,255 | 12/1974 | Spencer | 224/42.03 B |

*Primary Examiner*—Leo Friaglia
*Assistant Examiner*—R. Schrecengost
*Attorney, Agent, or Firm*—William J. Ruano

[57] ABSTRACT

A carrier for motorcycles and containers for mounting on the rear of a vehicle. The carrier assembly is mounted on a single hitch or receptacle conventionally used on campers and similar vehicles for towing trailers and the like. The assembly comprises a pivotally mounted platform on which the motorcycle is mounted by attaching a ramp on one end, which ramp, when reversed and pivotally secured to the platform, serves as an adjustable stop element for supporting different lengths of motorcycles or the like.

A collapsible container is similarly supported and includes special locking means for assured retention of the container.

6 Claims, 3 Drawing Figures

3,912,098

MOTORCYCLE AND CONTAINER CARRIER FOR VEHICLES

This invention relates to a carrier assembly for supporting a smaller vehicle, such as a motorcycle, motor bicycle or skooter, snowmobile, or even a luggage compartment on the rear end of a vehicle, such as a station wagon, camper truck or the like.

An outstanding disadvantage of motorcycle carriers presently used is that they require special attachments and hitches for securing them to the rear of a vehicle. This adds considerably to the cost and also requires the welding or bolting of parts of the carrier to the rear of the vehicle which mars the vehicle and adds substantial expense.

Another disadvantage or presently used carriers is that they involve considerable manual labor in mounting the auxiliary vehicle on the carrier and require special means for rigidly holding the auxiliary vehicle in place.

Still another disadvantage is that the carrier and the supported motorcycle are exposed to damage by collision from the rear since the bumper is on the vehicle side of the carrier, therefore leaving the carrier completely unprotected on the rear of the vehicle.

An object of the present invention is to provide a novel carrier for carrying an auxiliary vehicle, such as a motorcycle, motorbike, motor scooter, snowmobile or a luggage container, which carrier is devoid of the abovenamed disadvantages.

A more specific object of the present invention is to provide a novel carrier for auxiliary vehicles, which carrier can be easily and quickly mounted on a conventional, single connection type hitch as found in a great number of station wagons, tractors, camper trucks and the like for towing wheel mounted loads.

A further object of the invention is to provide a pivotal platform rotatably mounted on a fixed support of the carrier to which a ramp is pivotally secured, whereby upon wheeling the motorcycle up the ramp and onto the platform, the ramp can be converted to an adjustable stop element for securely supporting one end of the motorcycle against rolling movement.

Still another object of the invention is to provide a novel carrier support having the dual function of pivotally supporting the carrier platform and supporting a protective bumper so as to prevent possible damage by a collision from another vehicle.

Other objects and advantages will become apparent from a study of the following description taken with the accompanying drawings wherein.

Figure 1:
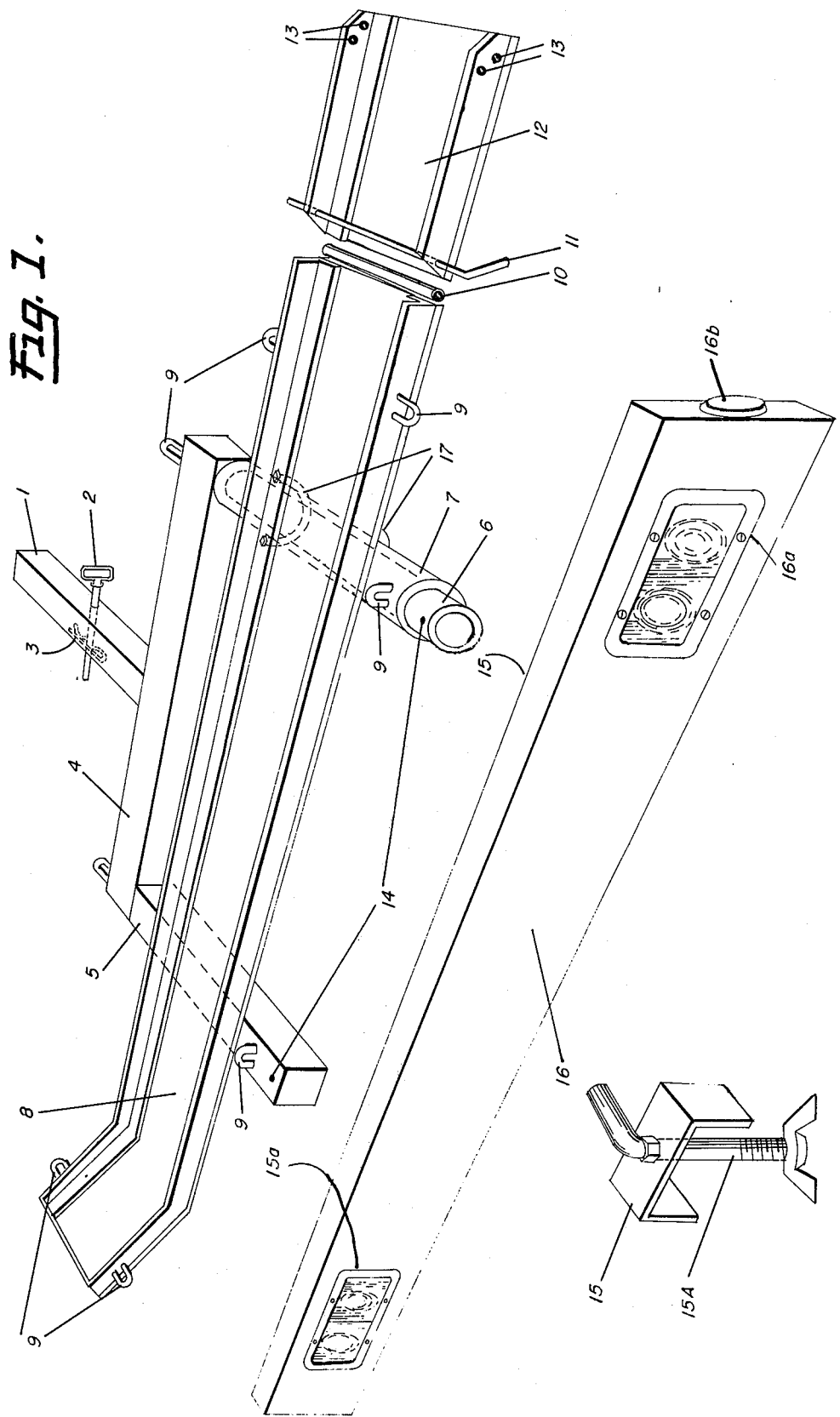
FIG. 1 is an exploded, perspective view of a motorcycle or similar auxiliray vehicle carrier embodying the present invention.

Referring more particularly to FIG. 1 of the drawing, numeral 1 denotes a rectangular or square shaped metal tube adapted to be slip-fitted into a correspondingly shaped but slightly larger female tubular receptacle which is conventionally supported on a cross frame underneath the rear portion of a towing vehicle, such as a station wagon, tractor, camper truck and the like (not shown), which may be of the well known Resse Type 750 made by the Reese Manufacturing Co. in Indiana, Pennsylvania. By registering corresponding holes in the sides of the tube 1 and tubular receptacle (not shown), a locking pin 2 is inserted and locked in place by cotter pin 3 to prevent relative telescoping movement of the hitch receptacle and tube 1.

Rigidly welded or otherwise secured to the end of tube 1 is a cross member of tubular construction 4 having rigidly attached to the ends thereof a rectangular support tube 5 and pipe 6 of circular cross-section. Telescopically fitted on pipe 6 for pivotal movement about their common axis is a cylindrical sleeve 7 which is integrally fastened to the bottom of platform 8, such as by means of a pair of U bolts 17 whose extremities are either bolted onto or welded to plateform 8.

This arrangement enables the platform 8 and the unitary or integral sleeve 7 to pivot as a single unit about the stationary pipe 6 to allow the left end of the platform 8 to be selectively lifted away from or to rest directly on the support tube 5.

At different locations alongside the ends and on the ends of the platform 8 are bolted, or otherwise integrally secured, a plurality of U shaped loops or fasteners 9 through which flexible guy straps and the like may be inserted after wrapping around the top of the motorcycle (not shown) when mounted on the platform 8 to prevent tipping sidewise.

The left end portion of platform 8, as viewed in FIG. 1, is tapered angularly upwardly to serve as a stop for preventing further rolling movement of the front wheel of the motorcycle or other auxiliary vehicle mounted on the platform 8.

A unique feature of the present invention resides in the hinge 10 into which a rod or pin 11 is adapted to be inserted when the rod 11 is selectively inserted either in the registering holes in the sides of ramp 12 in which rod 11 is inserted, as illustrated in the drawing, or in either of two pairs of holes 13 on the other end of the ramp 12. In the position shown, the ramp 12 is pivotally connected by pin 11 when inserted in the hinge 10 and allowed to taped downwardly onto the ground to enable a motorcycle to be wheeled onto the ramp 12, thence onto platform 8 while the platform is in the tilted position with the left end raised above tube 5 and the right end below pipe 6, with the right extremity of ramp 12 supported on the ground.

After the motorcycle is wheeled up ramp 12 and onto platform 8, pin 11 is pulled out of hinge 10 and the registering holes in the sides of ramp 12 and the ramp is reversed so that the pin 11 is selectively inserted into either of the two pairs of registering holes 13, depending upon the angle of tilt upwardly desired relative to ramp 12, which is dependent upon the length of the motorcycle. That is, for a shorter motorcycle, one pair of registering holes 13 will allow ramp 12 to be tilted to less than 90° relative to platform 8, whereas insertion of pin 11 through the other pair of registering holes 13 will allow ramp 12 to extend upwardly at an angle greater than 90° relative to the platform 8 to accomodate a longer motorcycle.

Extending vertically and diametrically through the top and bottom of tube 5 and pipe 6 are two pairs of holes 14, respectively, through which pins and cotter pins (not shown but similar to elements 2 and 3) may be inserted after the end of tube 5 is slip-fitted into a correspondingly shaped but slightly larger rectangular female receptacle welded to the interior side of the web of bumper 16 (not shown). Similarly the free end of pipe 6 is slip-fitted or telescoped into a tubular receptacle of corresponding round shape welded to the interior side of the web portion of bumper 16 and thereafter is held in place by a pin and cotter pin arrangement similar to elements 2 and 3.

A modification for securing the free end of tube 5 to bumper 16 is to weld the inverted U-shaped edge of channel 15 to the inner surface of the web of bumper 16 and to extend bolt 15A through holes 14 while channel 15 closely embraces the top and sides of tube 5. Similarly a semi-circular channel may be used to embrace pipe 6.

Instead of providing an angularly upwardly extending end portion of platform 8, there may be provided a pivotal ramp which may be identical to ramp 12 shown at the opposite end, so that vehicles may be ramped at either end of platform 8.

A pair of tail lights 16a and turn signals 16b, by a flexible electrical cord, may be plugged into an electrical outlet usually found at the rear of the vehicle. (not shown)

Figure 2:
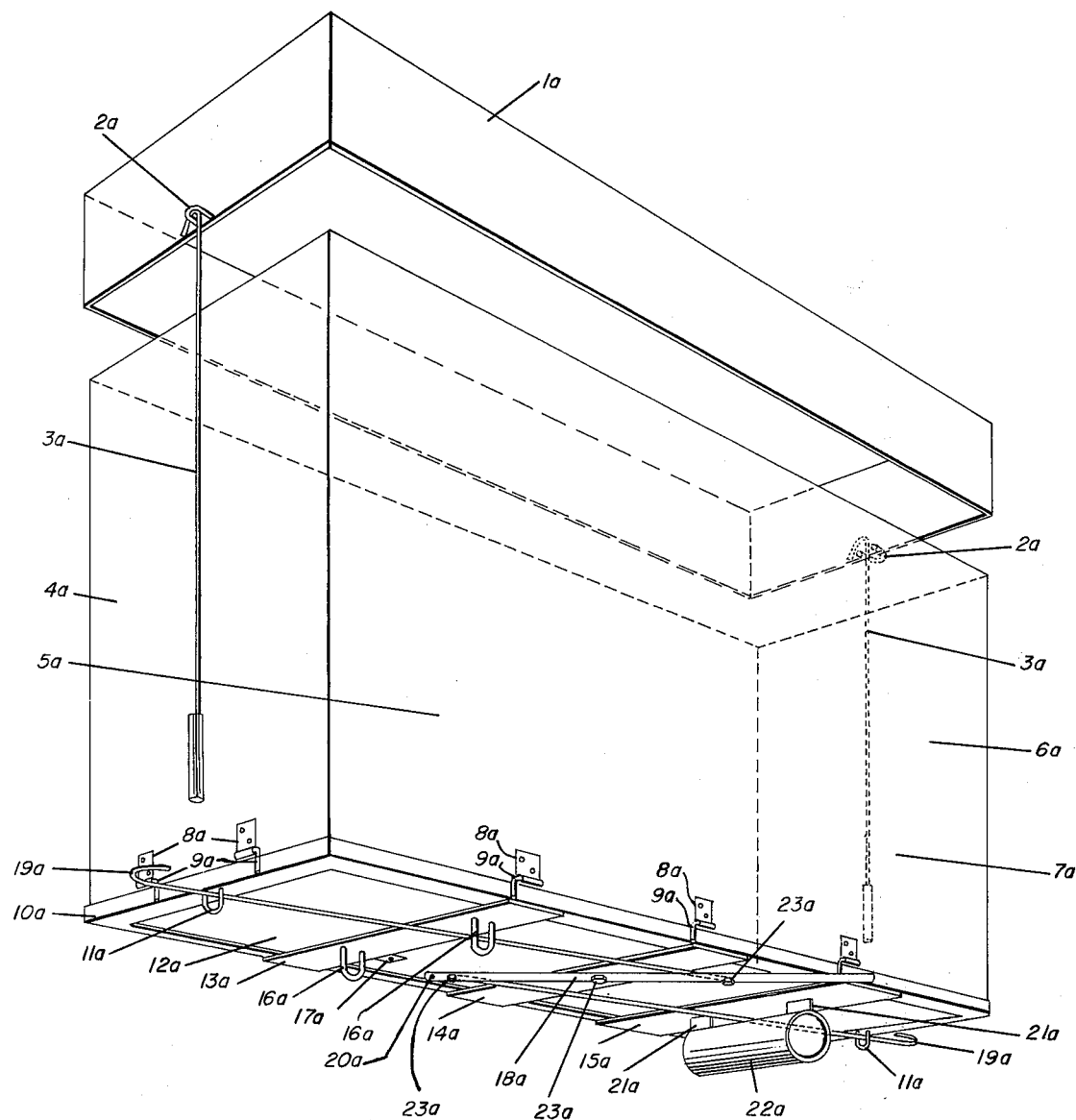
FIG. 2 is a bottom, perspective view of a container for mounting on the carrier support shown in FIG. 1; and, FIG. 3 is an enlarged, fragmentray, perspective view showing one of the locking hooks 19 of FIG. 2 in the locking position.
Figure 3:
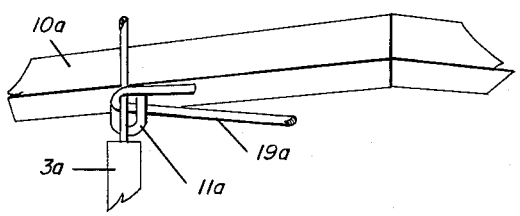

FIGS. 2 and 3 show a modification wherein the same detachable support assembly for platform 8 may be used to support a large container instead. The container is a collapsible one comprising a lid 1a, a pair of U-shaped end supports 2a suspending a pair of pendulum rods 3a which are suspended by gravity, aided by a bottom weight, alongside the sides 4a of the container, which sides are pivotal by virtue of hinges 8a which are pivotally connected to inverted L-shaped pins 9a welded to the edges of the bottom 10a of the box.

Similarly, the opposite, major sides 5a are hinged to the longitudinal edges of the box by a plurality of hinge pin assemblies 8a, 9a, to make the box pivotally collapsible on all four sides.

Underneath the bottom 10a of the container are a plurality of U-shaped wire guide loops 11a, and 16a, welded or otherwise secured to the bottom of the box 10a and to the bottom of cross-brace 13a.

After the lid 1a is lowered onto the open container, the bottom ends of the pendulum rods 3a move downwardly past locking hooks 19a which extend beyond the side edges of the container. In order to lock the pendulum rods 3a, therefore the lid of the container, hooks 19a are moved inwardly towards each other by turning a lever 18a about its pivot 23a mounted centrally of cross-brace 14a. The locked position is shown in FIG. 3, whereas the unlocked position is shown in FIG. 2.

It will be noted that pipe 22a welded or otherwise rigidly secured to the cross-brace 15a on the bottom of the container corresponds to sleeve 7 in FIG. 1, therefore is slip-fitted onto pipe 6 shown in FIG. 1 for supporting the container in place. The other side of the box, as viewed at the left of FIG. 2, is simply supported by gravity on tube 5 in the same manner as platform 8 in FIG. 1. Thus the container shown in FIG. 2 is interchangeable with the platform 8 and integral sleeve 7 assembly shown in FIG. 1.

Thus it will be seen that I have provided a highly efficient, inexpensive, carrier assembly involving a minumum number of parts, therefore relatively inexpensive to manufacture, for enabling easy loading of an auxiliary vehicle onto the platform and which assembly is completely supported by a single hitch element without the necessity of further supports by other attachments as normally required in most carrier assemblies; furthermore, I have provided a tiltable platform to enable easy wheeling of an auxiliary vehicle for secure support, particularly as aided by a ramp which is adjustably secured to the end of the platform depending upon the length of the auxiliary vehicle; furthermore, I have provided a bumper which is easily and quickly attachable to the same supporting elements as those for the platform so as to protect the carrier as well as the auxiliary vehicle against collisions from the rear by other vehicles; furthermore, I have provided an optional collapsible luggage container which is selectively mounted, instead of said platform, for pivotal support on the carrier supporting elements and including unique locking means for locking the sides, ends and cover of a container in place to prevent pilferage as well as to assure retention of the sides thereof.

While I have illustrated and described several embodiments of my invention, it will be understood that these are by way of illustration only and that various changes and modifications may be contemplated in my invention and within the scope of the following claims.

I claim:

1. A carrier for supporting an auxiliary vehicle or container on a single hitch of rectangular tubular construction mounted on the rear of a vehicle, said carrier comprising a tubular element of rectangular cross-section adapted to be telescoped and firmly secured to said single hitch, a cross-beam integrally secured centrally to an end portion of said tubular element, a second tubular element of rectangular cross-section having one end integrally secured to one end of said cross-beam, a pipe having one end integrally secured to the other end of said cross-beam, said second tubular element and pipe extending horizontally in the same plane as said cross-beam, and a sleeve journalled about said pipe for pivotal movement about the axis of said pipe, and a base element integrally secured to the top of said pipe so as to pivot on the axis of said pipe, said base element adapted to rest on the top of said second tubular element but being liftable therefrom when said base element is tilted.

2. A carrier as recited in claim 1 wherein said base element is a platform for supporting an auxiliary vehicle, together with a loading ramp pivotally connected to one end of said platform, the other end of said platform extending angularly upwardly to serve as a stop for the front wheel of said auxiliary vehicle after it has been wheeled along said ramp and onto said base, the other end of said ramp having side portions, a pair of registering holes in said side portions through which a pin may be inserted for selective pivotal attachment to said one end of the base after loading for holding said ramp in a substantially right angular position relative to said platform so as to serve as a stop for the rear wheel of said auxiliary vehicle.

3. A carrier as recited in claim 1 together with a bumper having a pair of fittings on the rear surface facing said carrier for telescoping engagement with said second tubular element and said pipe and attachment thereto for rigidly supporting said bumper to the ends thereof.

4. A carrier as recited in claim 3 together with a vertically staggered second pair of registering holes in said side portions of the ramp for providing an adjustable stop be permitting said ramp to extend vertically upwardly at a different angle than that provided by said first mentioned pair of registering holes to accomodate vehicles of different lengths.

5. A carrier as recited in claim 1 wherein said base forms a base portion of a rectangular box having a removable lid, said sleeve being integrally welded to the bottom surface of said container, a pair of pendulum rods suspended from the ends of said lid so that when the container is closed by said lid, weighted ends of said pendulum rods will extend below said bottom surface, and locking means including a pair of hooks which are selectively movable towards or away from the center of said base for hooking the rod portions of said pendulum rods when in the locked position.

6. A carrier as recited in claim 3 wherein tail lights are mounted on said bumper.

* * * * *